United States Patent
Maguire et al.

(10) Patent No.: US 11,507,741 B2
(45) Date of Patent: Nov. 22, 2022

(54) DOCUMENT TRACKING THROUGH VERSION HASH LINKED GRAPHS

(71) Applicant: The Landmark @ One Market, San Francisco, CA (US)

(72) Inventors: Robert Evon Maguire, San Rafael, CA (US); Ravinder P. Krishnaswamy, San Francisco, CA (US)

(73) Assignee: AUTODESK, INC., San Francisco, CA (US)

( * ) Notice: Subject to any disclaimer, the term of this patent is extended or adjusted under 35 U.S.C. 154(b) by 139 days.

(21) Appl. No.: 17/068,545

(22) Filed: Oct. 12, 2020

(65) Prior Publication Data
US 2021/0110108 A1    Apr. 15, 2021

Related U.S. Application Data

(60) Provisional application No. 62/913,380, filed on Oct. 10, 2019.

(51) Int. Cl.
*G06F 40/197* (2020.01)
*G06F 16/13* (2019.01)
(Continued)

(52) U.S. Cl.
CPC .......... *G06F 40/197* (2020.01); *G06F 16/137* (2019.01); *G06F 16/152* (2019.01);
(Continued)

(58) Field of Classification Search
CPC .... G06F 40/197; G06F 16/137; G06F 16/152; G06F 16/9014; G06F 16/9024; G06F 16/93
(Continued)

(56) References Cited

U.S. PATENT DOCUMENTS

| 7,062,532 B1 | 6/2006 | Sweat et al. |
| 9,710,544 B1 | 7/2017 | Smith et al. |

(Continued)

FOREIGN PATENT DOCUMENTS

EP    3410295 A1 *  12/2018

OTHER PUBLICATIONS

Dyreson et al., "Managing Versions of Web Documents in a Transaction-time Web Server", in Proceedings of the 13th International Conference on World Wide Web, May 2004, pp. 422-432. (Year: 2004).*

(Continued)

*Primary Examiner* — Phuong Thao Cao
(74) *Attorney, Agent, or Firm* — Gates & Cooper LLP

(57) ABSTRACT

Embodiments of the invention provide the ability to track document versioning. Before executing an open operation on a first document version, a first before-hash is generated. After executing the open operation, a first after-hash is generated. Before executing a save operation, the first before-hash is acquired, and after execution (resulting in a second document version), a second after-hash of the second document version is generated. A version hash linked graph (VHLG) is generated and includes document nodes for the different document versions where each node includes a hash of that document version, a user-application node corresponding to the user or application that executed the operations, and edges connecting the nodes (e.g., that identify the operation and/or the document lineage) Based on the VHLG, a full history of a document is provided.

20 Claims, 10 Drawing Sheets

(51) Int. Cl.
*G06F 16/14* (2019.01)
*G06F 16/901* (2019.01)
*G06F 16/93* (2019.01)

(52) U.S. Cl.
CPC ...... *G06F 16/9014* (2019.01); *G06F 16/9024* (2019.01); *G06F 16/93* (2019.01)

(58) Field of Classification Search
USPC ......................................................... 707/695
See application file for complete search history.

(56) References Cited

U.S. PATENT DOCUMENTS

| | | | | |
|---|---|---|---|---|
| 9,892,260 | B2* | 2/2018 | Kotler | G06F 21/577 |
| 10,585,903 | B2* | 3/2020 | Chin | G06F 16/9535 |
| 10,666,708 | B1* | 5/2020 | Gavalas | H04L 67/06 |
| 2006/0217603 | A1 | 11/2006 | Mathias | |
| 2007/0219942 | A1 | 9/2007 | Wolff et al. | |
| 2012/0259863 | A1 | 10/2012 | Bodwin et al. | |
| 2013/0185252 | A1* | 7/2013 | Palmucci | G06F 16/93 707/608 |
| 2015/0161153 | A1* | 6/2015 | Gheith | G06F 16/13 707/695 |
| 2016/0063061 | A1* | 3/2016 | Meyerzon | G06F 16/93 707/749 |
| 2017/0364701 | A1* | 12/2017 | Struttmann | G06F 21/78 |
| 2018/0113862 | A1* | 4/2018 | Glover | G06F 16/1873 |
| 2019/0050562 | A1* | 2/2019 | Rhee | G06F 21/566 |
| 2019/0340379 | A1* | 11/2019 | Beecham | H04L 9/3239 |
| 2020/0117705 | A1* | 4/2020 | Hance | G06F 16/152 |
| 2020/0162236 | A1* | 5/2020 | Miller | G06F 40/174 |
| 2020/0210519 | A1* | 7/2020 | Wang | G06F 16/137 |
| 2021/0026894 | A1* | 1/2021 | Yang | G06F 16/903 |

OTHER PUBLICATIONS

Kang et al., "The Hash History Approach for Reconciling Mutual Inconsistency", in Proceedings of the 23rd International Conference on Distributed Computing Systems, May 2003, IEEE Computer Society, 8 pages. (Year: 2003).*

Koop, D., "Versioning Version Trees: The provenance of actions that affect multiple versions", The 6th International Provenance and Annotation Workshop, 2016, 12 pages. (Year: 2016).*

Fachat, A., "How Does Git Work?—IBM Developer", http://developer.ibm.com/technologies/web-development/tutorials/d-learn-workings-git/, 2015, pp. 1-16, as downloaded Feb. 26, 2020.

PCT International Search Report & Written Opinion dated Jan. 26, 2021 for PCT Application No. PCT/US2020/055270.

Balter, B., "WP Document Revisions—Document Management and Version Control for WordPress." Aug. 29, 2011, Retrieved on Dec. 21, 2020 from https://ben.balter.com/2011/08/29/wp-document-revisions-document-management-version-con trol-wordpress/, pp. 1-15.

* cited by examiner

DOCUMENT TRACKING THROUGH VERSION HASH LINKED GRAPHS

CROSS-REFERENCE TO RELATED APPLICATIONS

This application is related to the following and commonly-assigned patent application, which application is incorporated by reference herein:

U.S. Patent Application Ser. No. 62/913,380, filed on Oct. 10, 2019, with inventor(s) Robert Maguire and Ravinder Krishnaswamy, entitled "Document tracking through Version Hash Linked Graphs".

BACKGROUND OF THE INVENTION

Field of the Invention

The present invention relates generally to tracking document versions, and in particular, to a method, system, apparatus, and article of manufacture for connecting document versions using a document hash that is used to construct a graph that may be further analyzed and utilized.

Description of the Related Art

In today's cloud connected and multi-device world, collaboration through sharing documents and document content is the norm. Such collaboration requires coordinated access of document and document content versions. Furthermore, analysis of the collaborators and the collaboration itself (e.g., what and how the collaborators are interacting/saving/editing/viewing files/documents within the collaboration environment, etc.) in an efficient and comprehensive manner can inform application product feature development. In this regard, collaboration makes it increasingly important for businesses that provide document viewing and editing applications to:
  1. Understand how different segments of users and industries interact with each other in order to help the business prioritize investment in product features; and
  2. Provide productivity enhancement tools that address challenges of their users collaborating on shared documents, such as timely notification of document edits and document version reconciliation.

Techniques that exist in prior art which use hash based linkage for collaboration scenarios are described below. These provide context for the key new concepts in the present invention and the problem space they address,

Use of Chained Hashes

The notion of linking versions of data by hashes is not new. The underlying mechanism for GIT uses hashes of commits—and chains together the commit hashes to generate a DAG (Directed Acyclic Graph) of commits for efficient lookup of commit context using hashes only. FIG. 1 illustrates a DAG of hash commits used in GIT. As illustrated, each time changes are committed to code (referred to as a "commit"), a snapshot is taken, and change sets between two snapshots can be applied or rolled back. Each snapshot is named with a commit/hash ID 102 that is derived from the content of the snapshot (e.g., actual content and some metadata such as time of submission, author information, parents, etc.). A stream of changes in GIT is an ordered list of change sets as they are applied one after another to go from one snapshot/commit 102 to the next. A pointer to a specific snapshot is referred to as a "branch" and the "head" 104 points to the location of the branch (e.g., master branch 106) that was last checked out of a workspace. Different features may be defined in other branches 108 that may be eventually merged into the master branch 106. Further branches 106-108 may be created on any valid snapshot version 110-112. In addition, as illustrated, commits 102 may have multiple parents 114, and each parent may have multiple children 116.

However, what is missing from such chained hashes is the ability to provide deeper context for a general understanding of the users/personas/industries performing the commits as well as the ability for a hash to be used more than to merely look up commit context.

In the crypto currency and distributed ledger world, different forms of chaining based on hash values are fundamental to the algorithms. FIG. 2 illustrates hash chaining as used in crypto currency. A blockchain is comprised of various blocks 202 that are linked 204 with one another. A hash tree (also referred to as a Merkle tree) encodes the blockchain 200 data. Every transaction 206 occurring on the blockchain 200 network has a hash 208 associated with it that are stored in a tree-like structure such that each hash 208 is linked to its parent following a parent-child tree-like relation. All the transaction hashes 208 in a block 202 are also hashed, resulting in a Merkle root 210. The Merkle root 210 contains all of the information about every single transaction hash 208 that exists on the respective block 202. Each block may also have a nonce 212 ("number only used once"). The nonce 212 is a number added to a hashed block 202 that, when rehashed, meets difficulty level restrictions, and is the number that blockchain miners are solving for. Each block 202 also contains a timestamp 214 (e.g., for the current time) that is used to establish a block's validity (e.g., a timestamp may be accepted as valid if it is greater than the median timestamp of the previous 11 blocks and less than the network-adjusted time +2 hours). Further, the previous hash 216 for each block 202 is a hash of the previous block 202 (e.g., an identification of/pointer to the hash of the previous block).

However, while hash functions are fundamental for blockchain algorithms in representing linkages of data blocks securely, they fail to provide the advantages of the structure of that of the present invention (as described below).

Data Management Solutions

In addition to the use of chained hashes as described above, prior art data management solutions may also be used to enable collaboration. However, prior art data management solutions (e.g., Product Data Management-PDM applications) require users to have their data work within the constraints of the application for version management and notification.

In view of the above, what is needed is the flexibility to enable collaboration and an analysis of such collaboration that is efficient and not constrained to a particular application or document repository.

SUMMARY OF THE INVENTION

Embodiments of the invention provide a data structure to connect document versions by using a document hash and/or unique identifier of its content to construct a graph. Such a data structure and graph can be used for:
  Data analytics processing to infer collaboration networks of industries and user types through their access to common data. This addresses the ability to understand how different segments of users and industries interact with each other (e.g., to help a business priorities investment in product features).

Applications to detect out of date version document access, notification of document updates, and document version reconciliation and aggregate document usage statistics in an organization or project. This addresses the ability to provide productivity enhancement tools that address challenges of users collaborating on shared documents.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

File based documents, e.g. DWG files have a unique signature associated with them based on applying a hash algorithm on their content or a creating a new GUID every time the document is updated. Hashes for consecutive document versions linked with additional operation and usage contextual information are used to generate a dependency graph that can connect users and companies. The dependency graph can also be analyzed to provide useful information about the community, collaborators, and features used (and potential areas for expansion).

Version Hash Linked Graph

Figure 1:
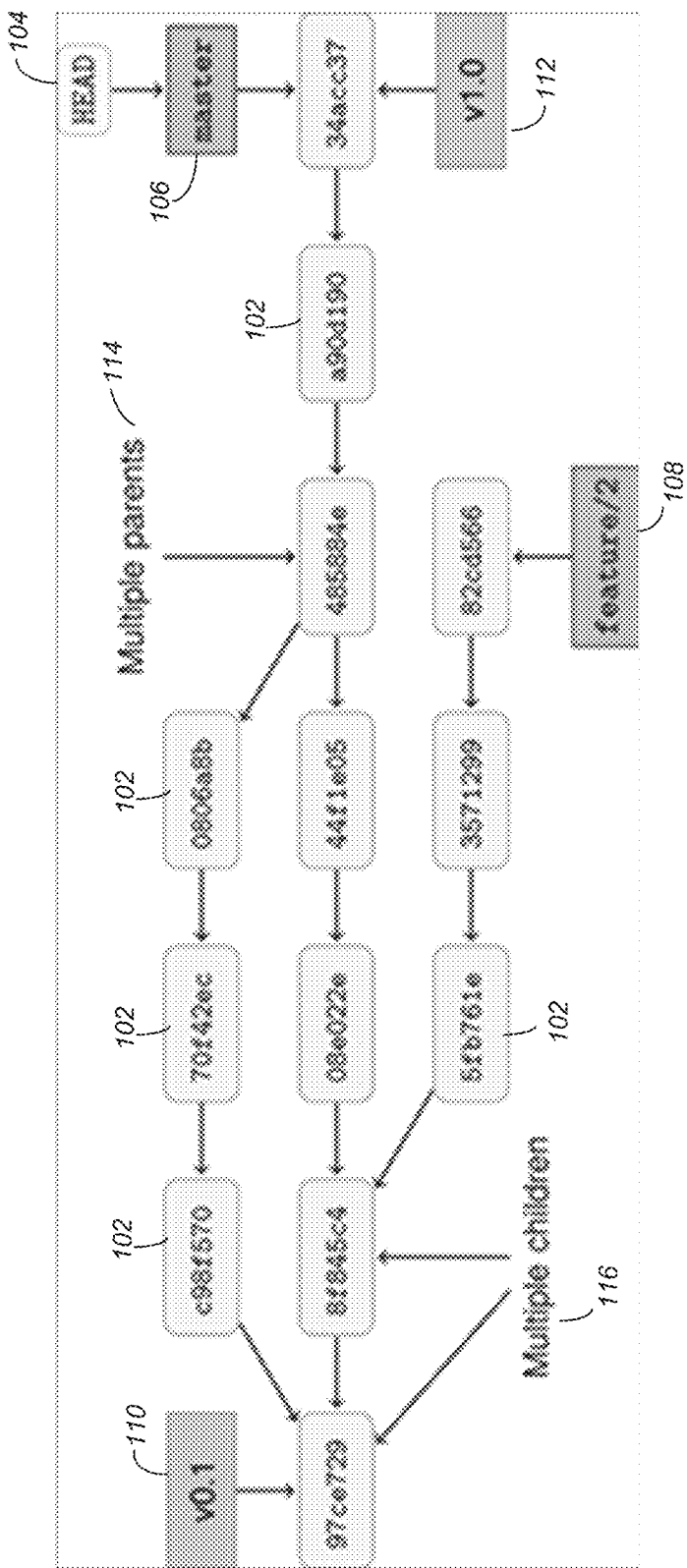
FIG. 1 illustrates a DAG of hash commits used in GIT of the prior art.
Figure 2:
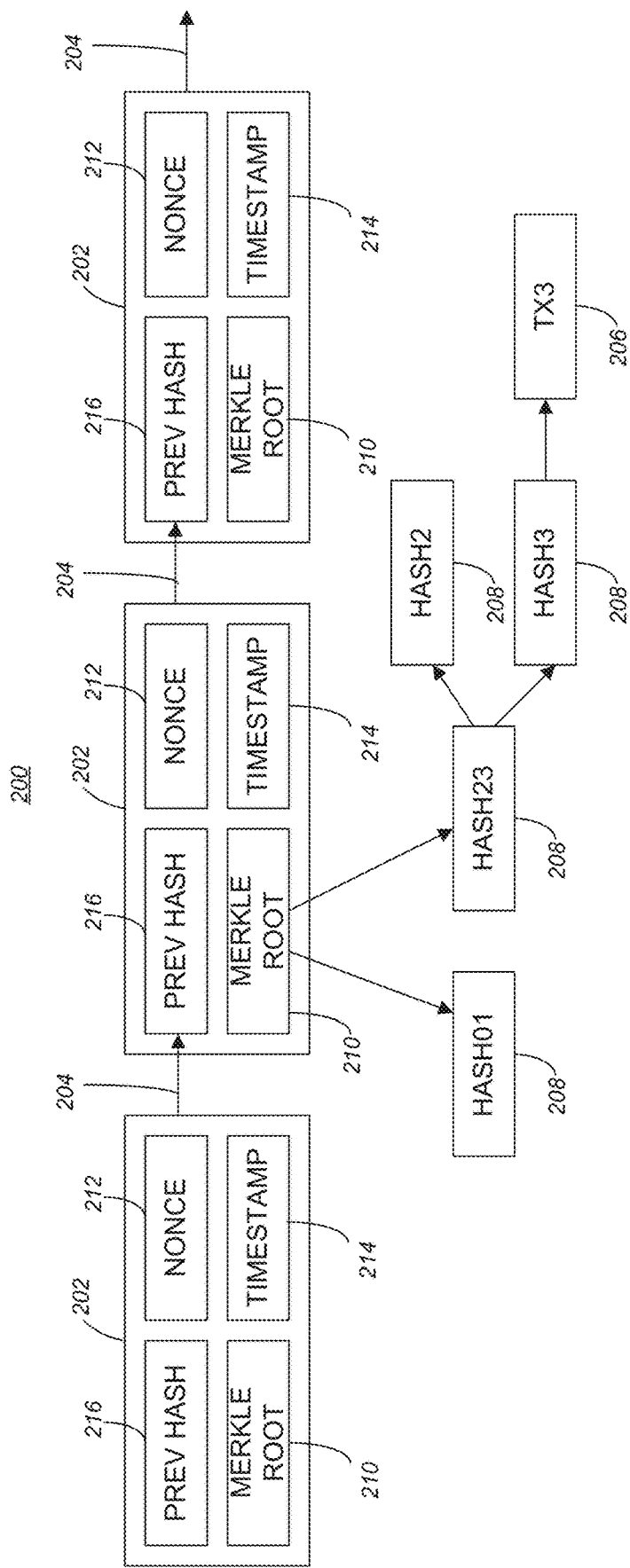
FIG. 2 illustrates hash chaining as used in crypto currency of the prior art.
Figure 3:
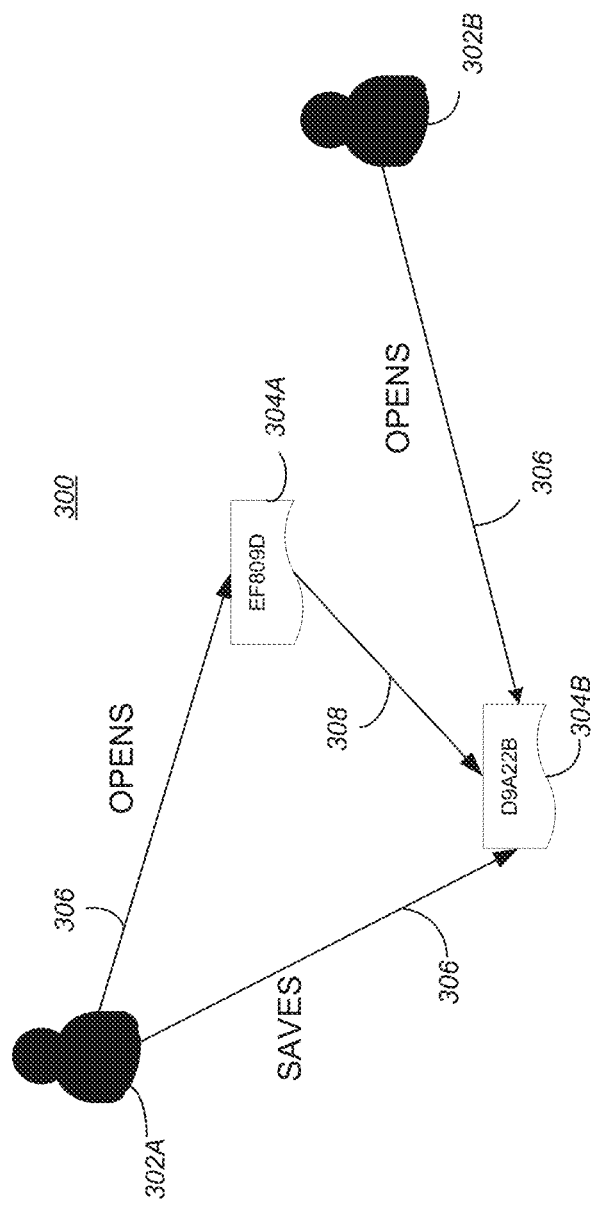
FIG. 3 illustrates an exemplary version hash linked graph in accordance with one or more embodiments of the invention.

Embodiments of the invention chain together successive version information (of a document) (i.e., before and after an operation—e.g., a version created on an edit followed by a save). This chain may be utilized to generate/obtain a full history of the document (e.g., without actually linking or storing the document itself). As used herein, this chain is referred to as a Version Hash Linked Graph (VHLG). FIG. 3 illustrates an exemplary version hash linked graph in accordance with one or more embodiments of the invention. The version hash linked graph 300 includes nodes 302-304 that correspond to users or applications (e.g., user nodes 302A and 302B—collectively user nodes 302) that access the document nodes 304 (i.e., document nodes 304A and 304B—collectively document nodes 304), edges 306 that indicate the operation and contain additional meta information such as time of access or product version, and edge 308 representing a version relation.

As illustrated in FIG. 3, the document nodes 304 are connected by arrows 308 representing a 'version' (or "descendant of") relationship (while edges 306 are operations that generate or access the version). End user nodes 302 are connected to document versions based on a referencing/editing operation (e.g., the user 302 OPENS or SAVES a document version). To construct the graph 300 from an application, a small amount of additional information—the hashes or ids associated with the operation being recorded—needs to be sent to a service or backend. This will allow the backend to assemble the graph from data that is obtained from multiple users. In embodiments of the invention, the information includes the hash before the operation and after the operation. For example, the following format may be used to log the information needed to construct the graph:

Log Item: (anonymized-user-id, platform, file-operation, hash-before, hash-after, time)

The following represent the log items that may be recorded/sent to a service/backend for FIG. 3:

(u88, 'desktop-win', 'open', 'EF8A09D', 'EF8A09D', 9310028)

(u88, 'desktop-win', 'save', 'EF8A09D', 'D9A22B', 9320031)

(u89, 'mobile-ios', 'open', 'D9A22B', 'D9A22B', 10311299)

These log items represent that user u88 302A has opened document EF8A09D 304A and then saved document D9A22B 304B (e.g., document EF8A09D 304A was modified and saved with the new hash as D9A22B 304B). Thereafter, user 302B opens document 304B. The log items above identify the user (u88 or u89), the platform (desktop windows or mobile-ios), the operation (open or save), the hashes before and after the operation (i.e., EF8A09D and D9A22B), and the time the operation was performed (9310028, 9320031, or 10311299) By comparing/linking the different hashes (e.g., both user u88 and u89 have the hash D9A22B in log items associated with each user), distinct users on different platforms that share the same data may be linked together.

As used herein, the hash can be generated using any type of hash algorithm as long as it produces a unique identifier (e.g., a hash or GUID) that represents the document 304. Further, the log item is the information that is stored/provided to a service/backend and is independent from the data itself. In this regard, only the log item/hash information is stored and can be used to rebuild/generate the history of a document.

Figure 4A:
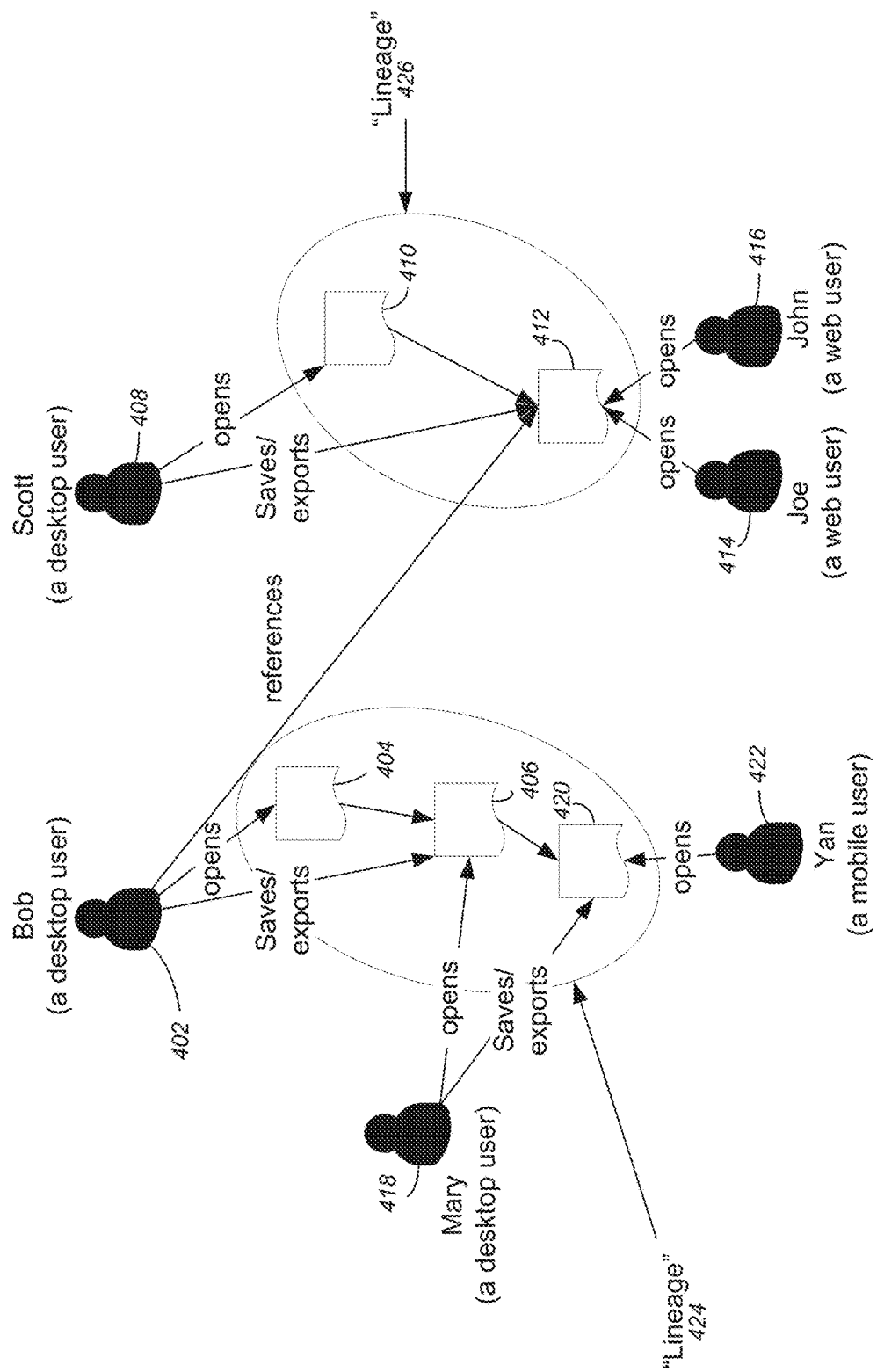
FIG. 4A illustrates an exemplary lineage that may be accessed in accordance with one or more embodiments of the invention.
Figure 4B:
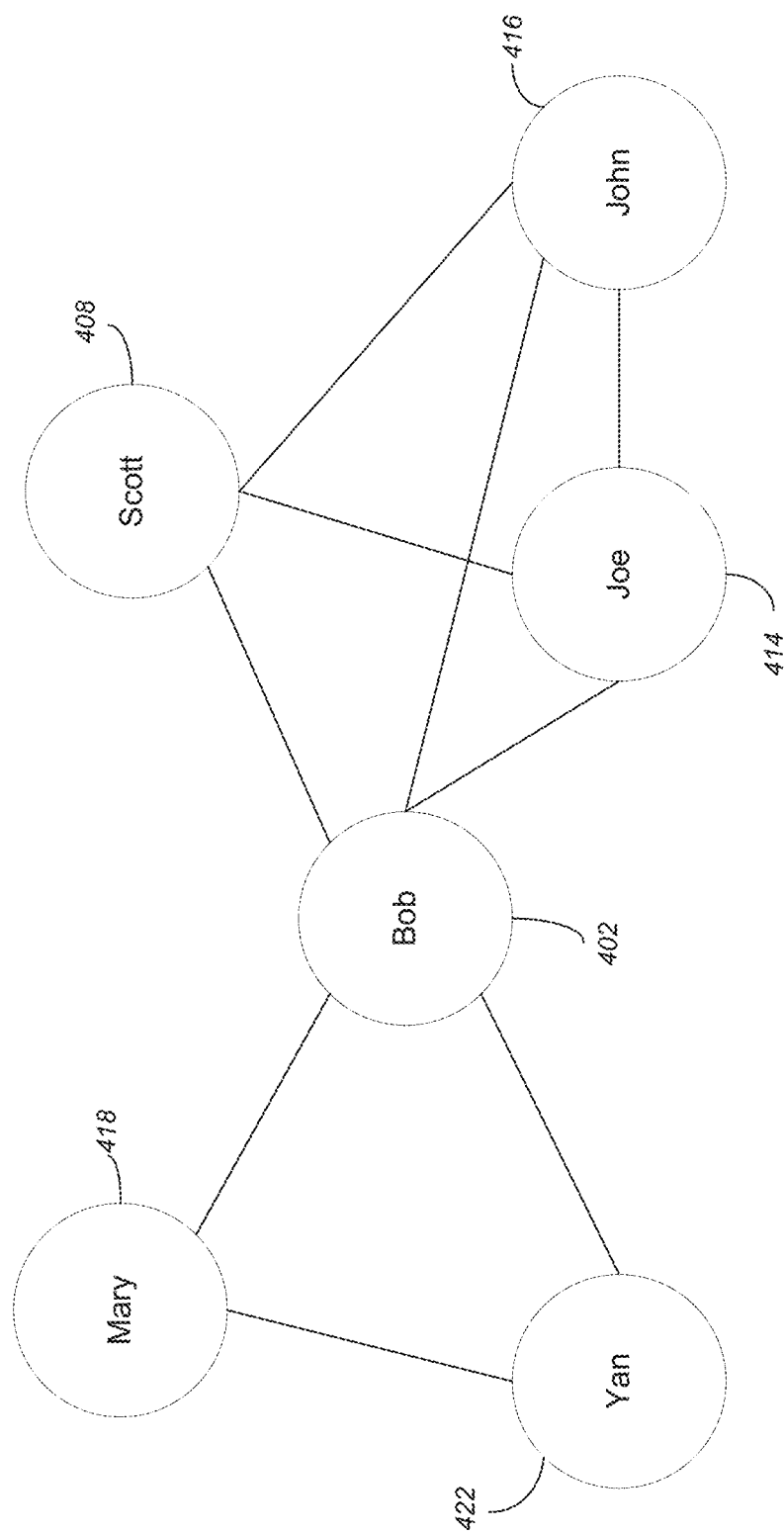
FIG. 4B illustrates the ability to link users based on the version hash linked graph of FIG. 4 in accordance with one or more embodiments of the invention.

The exemplary graph of FIG. 3 (and other VHLGs) will scale across time and multiple users. There is a natural notion of collaboration through access to a document that is part of a "lineage" of document versions (related or derived versions). FIG. 4A illustrates an exemplary lineage that may be accessed in accordance with one or more embodiments of the invention. As illustrated, desktop user Bob 402 has opened file 404, then saved/exported that file creating version 406. Desktop user Scott 408 has opened file 410, then saved and exported file 410 resulting in a new version 412 (as illustrated, versions 404, 406, 410, and 412 are all hashes in a VHLG). Bob 402 has also referenced version 412. Web users Joe 414 and John 416 have both opened version 412. Desktop user Mary 418 has opened version 406, and saved/exported it creating version 420 which has also been opened by mobile user Yan 422. Using the information in the log items (e.g., via the graph), the lineage 424 and 426 of document versions can be easily determined. Lineage 424 consists of the different document versions 404, 406, and 420, while lineage 426 consists of document versions 410 and 412. The hashes and operation information (e.g., open, save/exports, references) (as well as additional information) may be used to determine the lineage. FIG. 4B illustrates the ability to link users 402, 408, 414, 416, 418, and 422 based on the VHLG 400 of FIG. 4 in accordance with one or more embodiments of the invention.

An exemplary lineage/history determination may be illustrated by the following example: One could publish a PDF (portable document format) file from a CAD (computer-aided design) drawing. A hash is created for the CAD drawing (HashA) as well as the PDF (HashB) and an edge of the graph would connect the two. If a user were to open the PDF without knowledge of PDF's origination, the hash of the PDF could be computed/obtained again (resulting in HashB). The computed hash (HashB) could then be used to query the graph and retrieve the edge/determine that HashB originated from HashA. In this regard, with the before and after hash values, it is possible to determine the history/lineage of a document version without ever accessing/using the application that created the document (e.g., the CAD application) and without the documents residing/living in the same repository. In other words, one merely needs to query the VHLG to determine the document history.

Analytics and Insights at Scale Using the Version Hash Linked Graph

By constructing the graph at scale, and augmenting it with data (including more user context such as industry type, company type, etc., and edges with time of access, product version etc.), it is possible to infer and gain insights on communities that collaborate and understand access patterns over time.

Figure 5:
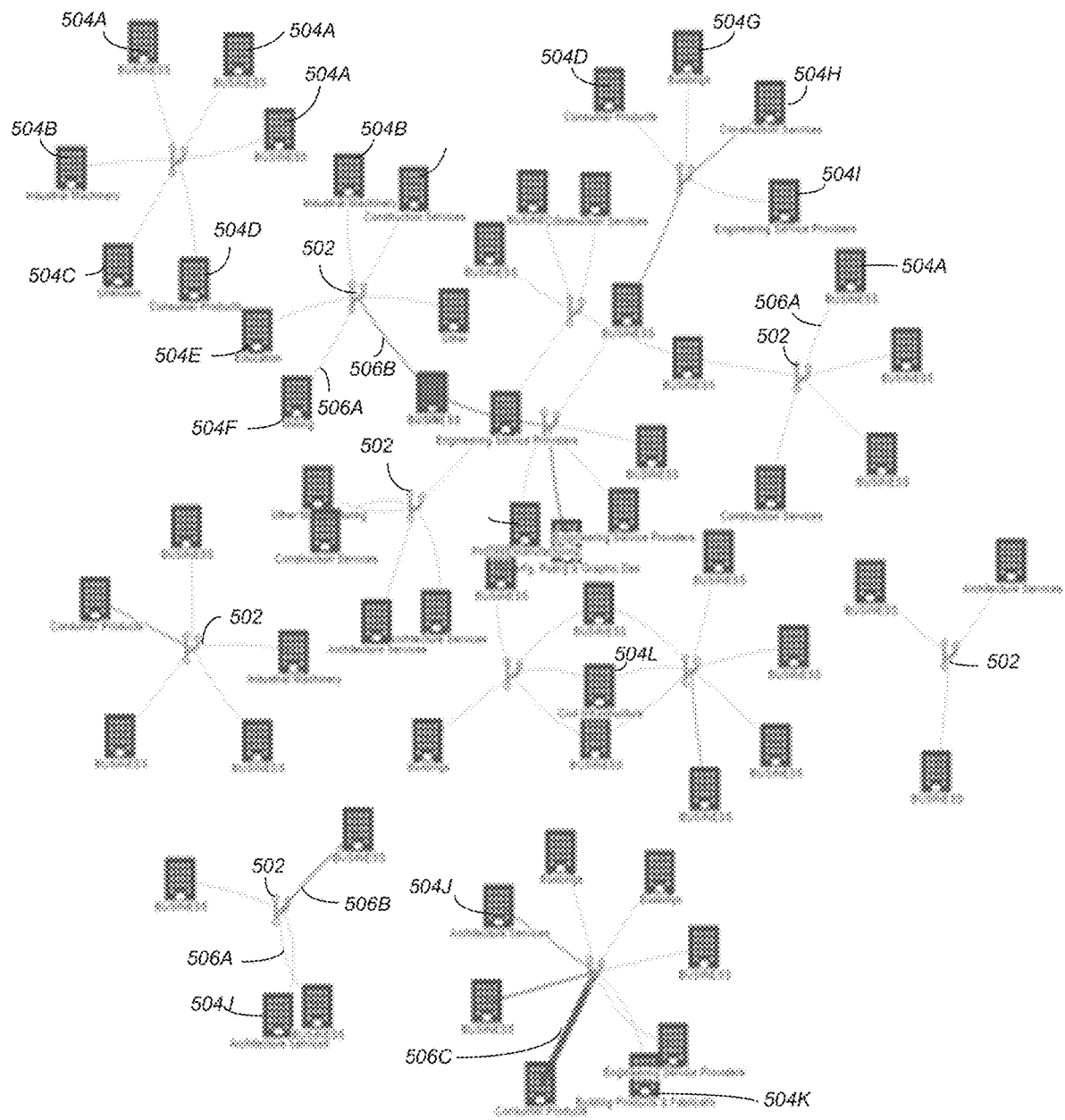
FIG. 5 illustrates an example of how the VHLG can be used to infer businesses that collaborate by their access to a common lineage in accordance with one or more embodiments of the invention.

FIG. 5 illustrates an example of how the VHLG can be used to infer businesses that collaborate by their access to a common lineage in accordance with one or more embodiments of the invention. More specifically, FIG. 5 shows an example of industry type collaboration that can be inferred from a VHLG. Each tree icon node 502 represents a lineage (collection of documents related by their version chain). Each company/industry type 504A-504L (collectively referred to as industry types 504) is represented by icons. Examples of the different types may include business 504A, industrial machinery 504B, unknown 504C, consumer products 504D, education 504E, mining 504F, buildings 504G, construction services 504H, engineering service providers 504I, architecture services 504J, buildings products and fabrication 504K, civil infrastructure 504L, etc. The thickness of the edge 506 (i.e., edges 506A-506C are collectively referred to as edges 506) is proportional to the number of accesses of the lineage from the company. For example, edge 504A represents fewer accesses of the lineage 502 (e.g., by the industry types connected to edges 504A) compared to the access represented by edge 504B, which has less accesses than that represented by edge 506C.

The example illustrated in FIG. 5 may be generated using big data analytics (e.g., APACHE SPARK and NEO4J (a graph database)). Such analytics can be used to evaluate the features to focus development on (e.g., if only a few users v. a significant fraction of users from a set of disciplines interact on certain document types or through specific features or operations on the documents).

Productivity and Data Management End User Features Using the Version Hash Linked Graph Additional embodiments of the invention power an end user feature with the VHLG. For a set of users that collaborate with data (e.g., users within a company), a VHLG can be constructed to capture access patterns and dependencies between file versions (as described above). Importantly—the actual file can reside anywhere. For example, if the data is accessed on a mobile device, web browser or a local drive—as long at the content in the file is identical, it will have the same signature.

Figure 6:
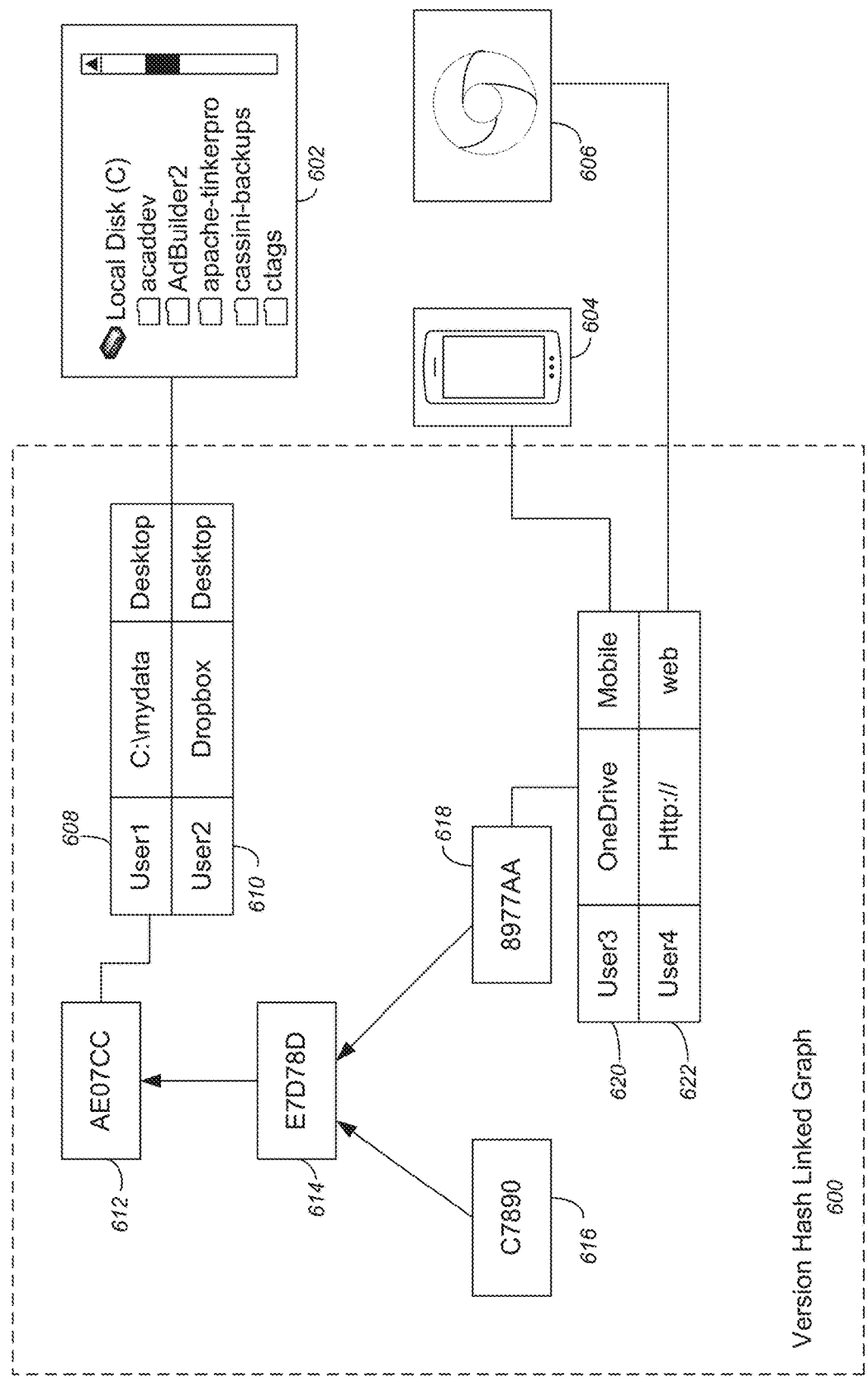
FIG. 6 illustrates a version hash linked graph/tree where data accessed from a variety of different locations/devices access version information with the same signature/hash/GUID.

FIG. 6 illustrates a version hash linked graph/tree where data accessed from a variety of different locations/devices access version information with the same signature/hash/GUID. The VHLG 600 is illustrated with access to the structure from local drive 602, a mobile device 604, and the web 606. Using the structure 600—when a user accesses a file—by referring to the VHLG 600—embodiments of the invention can tell if a user is updating the latest version, whether a new version is available for reference and so on. For example, User1 608 and User2 610 have both accessed file 612 represented by the hash from their local desktop computer 602. File 612 is the parent to file 614 (represented by hash E7D78D), which in turn is the parent to file 616 (represented by hash C7890) and file 618 (represented by hash 8977AA). Both User3 620 and User4 622 are accessing the same file version 618 as can be determined by the same hash 8977AA. Of note is that even though User3 620 is on mobile 604 and User4 622 is on the web 606, the file content 618 they are both accessing is identical (as can be confirmed by the hash 8977AA).

The concepts and applications of VHLG can be extend to operations and different formats. For example, a user may export to PDF from DWG or import a DWG into REVIT or INVENTOR documents.

Based on an analysis of the VHLG 600, graphical user interfaces (GUIs) may be generated that allow a user to visualize the analytics in an understandable and comprehensive manner. In a first example, the GUI may (partially) consist of VHLG itself (e.g., as illustrated in FIGS. 3 and 4A. Alternatively, the GUI may consist of a variety of different formats/presentations of the VHLG or otherwise. For example, the different icons and edges if a GUI of a VHLG may be differentiated (reflected different types/devices/etc.) based on color and/or pattern. In a specific example, different device types may be represented by different colors (e.g., green for desktop, red for web, and blue for mobile). In another example, one color (e.g., purple) may be used to specify the fingerprint of a specific file version while a chain of that color (purple) nodes may reflect a particular lineage. In addition, different arrows of different sizes (e.g., in combination or independent from edges themselves) may reflect the number of accesses to a specific node/fingerprint version).

While a depiction of the VHLG may be provided in one GUI, other GUIs may focus on a particular aspect of the data/data analysis. For example, a GUI may present a simple chart reflecting what fraction of data is accessed by distinct devices (e.g., with an x-axis for the minimum number of file versions per lineage and the y-axis reflecting the percentage of lineages accessed by more than 1 device). In another exemplary embodiment, a time series (heat) chart reflecting access patterns may be generated (with a y-axis of time slices where the chart illustrates a frequency of access across different companies/types of companies and allows a viewer to quickly determine if communication is synchronous or asynchronous and which documents most of the coordination needs centered on).

Logical Flow

Figure 7:
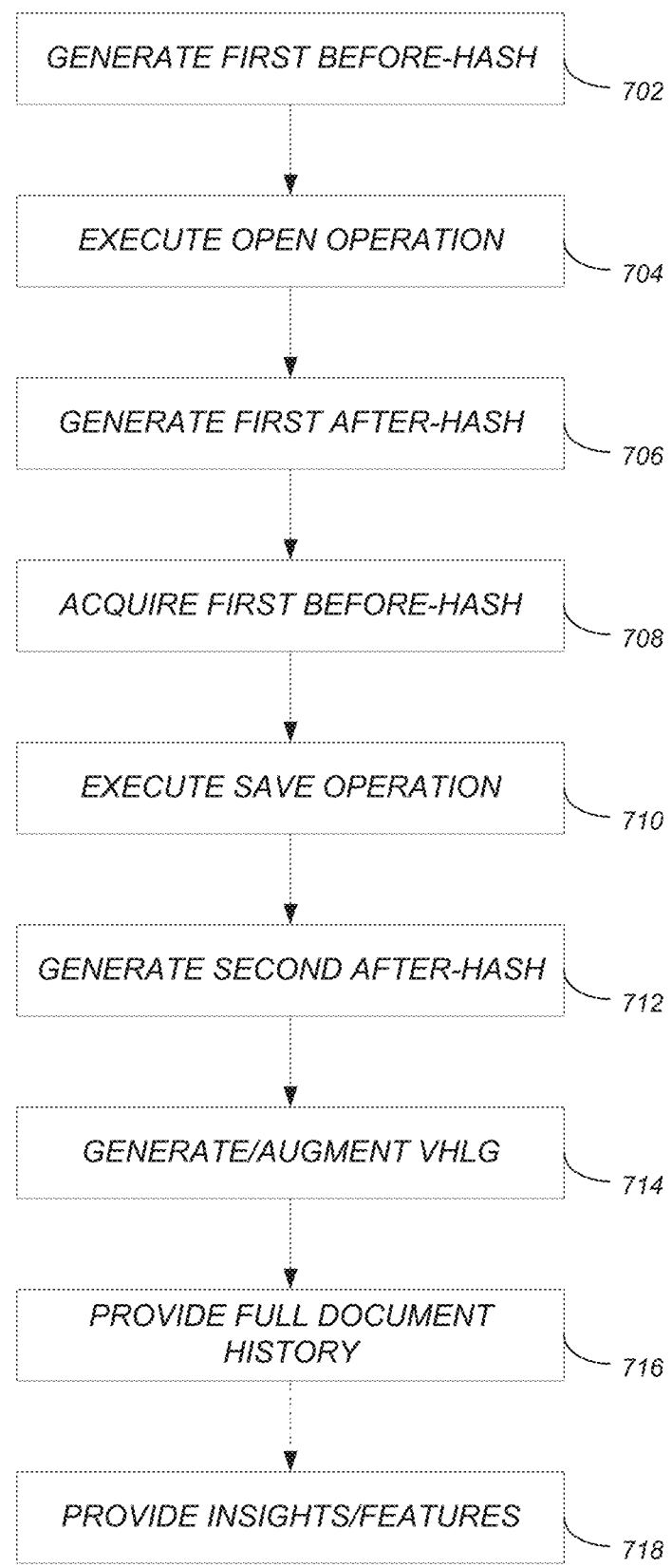
FIG. 7 illustrates the logical flow for tracking document versioning in accordance with one or more embodiments of the invention.

FIG. 7 illustrates the logical flow for tracking document versioning in accordance with one or more embodiments of the invention.

At step 702, before executing an open (or reference) operation on a first document version, a first before-hash of the first document version is generated.

At step 704, a user or an application executes the open operation.

At step 706, after executing the open operation, a first after-hash of the first document version is generated.

At step 708, before executing a save operation on the first document version, the first before-hash of the first document version is acquired (e.g., the hash function may execute again resulting in the same hash ID, and/or the system may recognize that the open operation did not change the first document version, and as a result, the same first before-has is acquired/obtained).

At step 710, the user or the application executes a save operation on the first document version resulting in a second document version.

At step 712, after executing the save operation, a second after-hash of the second document version is generated.

At step 714, a version hash linked graph (VHLG) is generated (or augmented). The VHLG includes a first document version node (comprising the first before-hash), a second document version node (comprising the second after-hash), a user-application node corresponding to the user and application that executed the open operation and the save operation, an open operation edge connecting the user-application node to the first document version node (wherein the open operation edge identifies the open operation), a save operation edge connecting the user-application node to the second document version node (wherein the save operation edge identifies the save operation), and a document edge connecting the first document version node to the second document version node.

The generation/augmentation of the VHLG may include sending information for the open operation and information for the save operation to a VHLG generating service (which generates the VHLG based on the information). The information for each operation includes a before operation hash, an after operation hash, and an identification of the operation. Such information may be specified/provided in a log item that includes an anonymized user identification corresponding to the user and the application, the platform used by the user or the application, the identification of the operation, the before-hash, the after-hash, and a time the operation was performed. For example, the information for the open operation may consist of the first before-hash, the first after-hash, and an identification of the open operation. The corresponding log item may include an anonymized user identification corresponding to the user and the application, a platform used by the user or the application, the identification of the open operation, the first before-hash, the first after-hash, and a time the open operation was performed. Accordingly, the VHLG may be augmented by individually recorded log items, and that the most up to date graph structure may be generated on demand from the log items recorded in a database (e.g., SPARK) or other data aggregation backend.

Similar to open operation, the information for the save operation may consist of the first before-hash, the second after-hash, and an identification of the save operation. The corresponding log item may consist of the anonymized user identification corresponding to the user or the application, the platform used by the user or the application, the identification of the save operation, the first before-hash, the second after-hash, and the time the save operation was performed.

At step 716, a full history of a document based on the VHLG is provided.

At optional step 718, insights (e.g., on community detection and collaboration networks)/end user features (e.g., for sharing and collaboration on documents) may be provided.

It may be noted that the VHLG scales across time and multiple users or multiple applications. Once scaled, an exemplary insight at step 718, a lineage may be determined based on the VHLG. In an exemplary embodiment, such a lineage may consist of a collection of documents related by a version chain, where the collection consist of the first document version and the second document version, and the version chain comprises the document edge.

An additional insight/feature at step 718 may include/provide for augmenting the first document version node and the second document version node with contextual data (e.g., industry type, company type, etc.). Based on the lineage and contextual data, a community (e.g., an industry type) that collaborates may be determined. In alternative embodiments an access pattern over time may be determined based on the VHLG.

One may also note that the data for the document may be stored independently from the VHLG (e.g., the actual file can reside anywhere). In this regard, regardless of a device platform (e.g., desktop, mobile, web) being used to access the first document version, the first before-hash remains the same (i.e., as long as the content in the first document version is identical). Similarly, regardless of the device platform being used to access the second document version, the second after-hash remains the same (i.e., as long as the content in the second document version is identical).

The additional insight/feature provided at step 718 may include a graphical user interface (GUI) which consists of a visualization of the VHLG that displays access patterns and dependencies between the first document version and the second document version. Such a GUI may be provided to collaborating users.

In addition to the above, collaboration features in step 718 may include operations that are performed when a user or application accesses the first document version or the second document version. In particular, based on the VHLG, a determination (e.g., querying the VHLG) may be performed regarding whether the first document version or the second document version is a most current version of the document. The accessing user/application may then be informed of the result of the determination.

Advantages

Embodiments of the invention provide advantages over the prior art in a variety of different contexts including desktop-web-mobile workflows, a drawing lifecycle, and collaboration clusters.

Desktop-web-mobile workflows relate to how files move between an application on a desktop computer (e.g., AUTO-CAD DESKTOP), a web-based version of the application on the web (e.g., AUTOCAD WEB), a mobile based version of the application on mobile (e.g., AUTOCAD MOBILE), and where each of these products fits in a cross-platform workflow. Analytics in this context may enable answers to the following questions:

- How many drawings (per week/month) created and edited on desktop are opened on web, on mobile? (Or the inverse, how many new drawings are created, and then opened again on web, on mobile?)
- What interval range are drawings typically exchanged between desktop-web, or desktop-mobile? (e.g., interval range=dwg opened on desktop, two days later on mobile, or 4 hours later opened on web, . . . etc.)
- How do drawings change when they are sent to web and mobile? What activities do these users do on each platform? Can we differentiate this by a single user (same person using 3 different platforms) vs. a team (different users using different platforms) use case?
- How many dwg's are first created on mobile or web and then brought back into desktop?

The drawing lifecycle relates to how a single drawing (e.g., a DWG file) evolves over time. This may include how the drawing is versioned, how it is enhanced or marked up, and by whom it is edited. Analytics may be used to answer the following questions with respect to the drawing lifecycle:

- Can we see different tiers of number of collaborators per DWG? For example, 1-2, 2-10, 10-20, etc.
- Can we relate stages of a DWG to typical project stages, including evolution over time (schematic design, design development, construction documentation, etc.)?
- Can we identify DWGs as part of the same project?
- How often does the "same" DWG change filenames? (Customers are using "save as" for project archiving, DWG of record, versioning, etc.). How can templates and standard DWGs be filtered out (e.g., detail sheets repeated on multiple projects, etc.)?
- Can we infer anything about out of band collaborators that took place in other tools? (e.g., REVIT, BLUEBEAM, paper, etc.)
- Can we identify how often users are starting a project from an existing DWG?
- How are the different collaborators accessing files during the different phases and on which platform?

Collaboration clusters (also referred to as collaboration persona clusters) relates to finding similarities in how people collaborate. Are some people super-sharers while others are end-points? What do these super-sharers have in common? Analytics may be used to answer the following questions with respect to collaboration clusters:

- User clusters: How many DWGs does a customer work on over X time period?
- User clusters (tiers of collaboration): How many people does a customer exchange DWGs with? Is it possible to divide this frequency with internal (designers to drafters) and external (contractors, project manager, etc.) collaborators?
- User clusters: Can we define super-collaborators? What type of users collaborate the most? What industry? What tech do they use?
- Can we identify "hot" time periods of collaboration in the lifecycle where more users are interacting more frequently with each other?
- Deeper cuts of any of these questions: If so, what storage provider are they on (local/cloud)? Are they in the same environment (e.g., 1 office) or multiple/at home? Are they using refs to break up that work? How many refs are in the drawing? What file formats?
- Which platforms have which piece of the collaboration story?
- Can we map out collaboration trends (across products in users' ecosystems) and which phase has the most back and forth collaboration or which phase takes the longest to complete?

Hardware Embodiments

Figure 8:
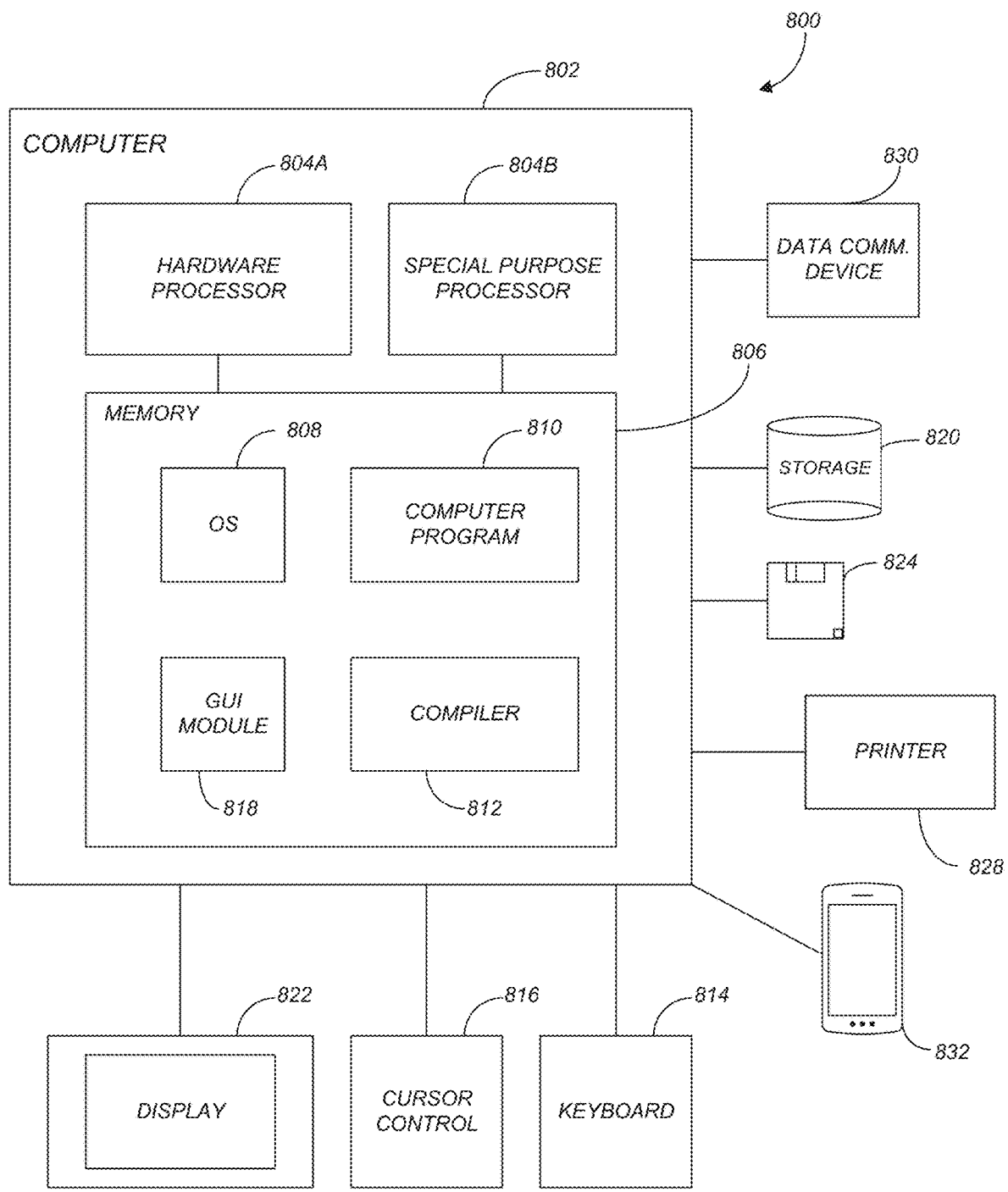
FIG. 8 is an exemplary hardware and software environment used to implement one or more embodiments of the invention.

FIG. 8 is an exemplary hardware and software environment 800 (referred to as a computer-implemented system and/or computer-implemented method) used to implement one or more embodiments of the invention. The hardware and software environment includes a computer 802 and may include peripherals. Computer 802 may be a user/client computer, server computer, or may be a database computer. The computer 802 comprises a hardware processor 804A and/or a special purpose hardware processor 804B (hereinafter alternatively collectively referred to as processor 804) and a memory 806, such as random access memory (RAM). The computer 802 may be coupled to, and/or integrated with, other devices, including input/output (I/O) devices such as a keyboard 814, a cursor control device 816 (e.g., a mouse, a pointing device, pen and tablet, touch screen, multi-touch device, etc.) and a printer 828. In one or more embodiments, computer 802 may be coupled to, or may comprise, a portable or media viewing/listening device 832 (e.g., an MP3 player, IPOD, NOOK, portable digital video player, cellular device, personal digital assistant, etc.). In yet another embodiment, the computer 802 may comprise a multi-touch device, mobile phone, gaming system, internet enabled television, television set top box, or other internet enabled device executing on various platforms and operating systems.

In one embodiment, the computer 802 operates by the hardware processor 804A performing instructions defined by the computer program 810 (e.g., a computer-aided design [CAD] application) under control of an operating system 808. The computer program 810 and/or the operating system 808 may be stored in the memory 806 and may interface with the user and/or other devices to accept input and commands and, based on such input and commands and the instructions defined by the computer program 810 and operating system 808, to provide output and results.

Output/results may be presented on the display 822 or provided to another device for presentation or further processing or action. In one embodiment, the display 822 comprises a liquid crystal display (LCD) having a plurality of separately addressable liquid crystals. Alternatively, the display 822 may comprise a light emitting diode (LED) display having clusters of red, green and blue diodes driven together to form full-color pixels. Each liquid crystal or pixel of the display 822 changes to an opaque or translucent state to form a part of the image on the display in response to the data or information generated by the processor 804 from the application of the instructions of the computer program 810 and/or operating system 808 to the input and commands. The image may be provided through a graphical user interface (GUI) module 818. Although the GUI module 818 is depicted as a separate module, the instructions performing the GUI functions can be resident or distributed in the operating system 808, the computer program 810, or implemented with special purpose memory and processors.

In one or more embodiments, the display 822 is integrated with/into the computer 802 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 802 according to the computer program 810 instructions may be implemented in a special purpose processor 804B. In this embodiment, some or all of the computer program 810 instructions may be implemented via firmware instructions stored in a read only memory (ROM), a programmable read only memory (PROM) or flash memory within the special purpose processor 804B or in memory 806. The special purpose processor 804B may also be hardwired through circuit design to perform some or all of the operations to implement the present invention. Further, the special purpose processor 804B may be a hybrid processor, which includes dedicated circuitry for performing a subset of functions, and other circuits for performing more general functions such as responding to computer program 810 instructions. In one embodiment, the special purpose processor 804B is an application specific integrated circuit (ASIC).

The computer 802 may also implement a compiler 812 that allows an application or computer program 810 written in a programming language such as C, C++, Assembly, SQL, PYTHON, PROLOG, MATLAB, RUBY, RAILS, HASKELL, or other language to be translated into processor 804 readable code. Alternatively, the compiler 812 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 810 accesses and manipulates data accepted from I/O devices and stored in the memory 806 of the computer 802 using the relationships and logic that were generated using the compiler 812.

The computer 802 also optionally comprises an external communication device such as a modem, satellite link, Ethernet card, or other device for accepting input from, and providing output to, other computers 802.

In one embodiment, instructions implementing the operating system 808, the computer program 810, and the compiler 812 are tangibly embodied in a non-transitory computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of computer program 810 instructions which, when accessed, read and executed by the computer 802, cause the computer 802 to perform the steps necessary to implement and/or use the present invention or to load the program of instructions into a memory 806, thus creating a special purpose data structure causing the computer 802 to operate as a specially programmed computer executing the method steps described herein. Computer program 810 and/or operating instructions may also be tangibly embodied in memory 806 and/or data communications devices 830, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 802.

Figure 9:
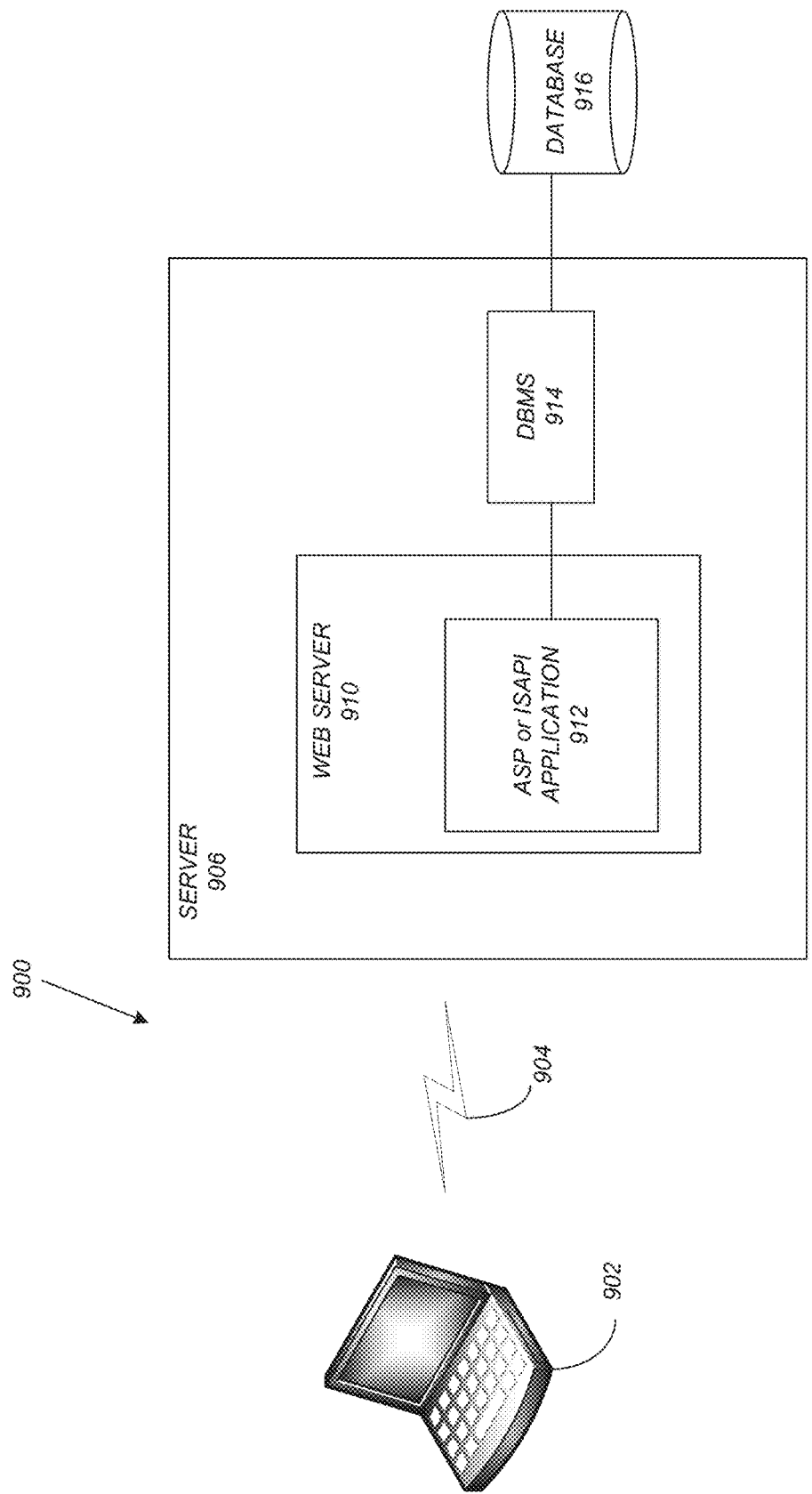
FIG. 9 schematically illustrates a typical distributed/cloud-based computer system in accordance with one or more embodiments of the invention.

FIG. 9 schematically illustrates a typical distributed/cloud-based computer system 900 using a network 904 to connect client computers 902 to server computers 906. A typical combination of resources may include a network 904 comprising the Internet, LANs (local area networks), WANs (wide area networks), SNA (systems network architecture) networks, or the like, clients 902 that are personal computers or workstations (as set forth in FIG. 8), and servers 906 that are personal computers, workstations, minicomputers, or mainframes (as set forth in FIG. 8). However, it may be noted that different networks such as a cellular network (e.g., GSM [global system for mobile communications] or otherwise), a satellite based network, or any other type of network may be used to connect clients 902 and servers 906 in accordance with embodiments of the invention.

A network 904 such as the Internet connects clients 902 to server computers 906. Network 904 may utilize ethernet, coaxial cable, wireless communications, radio frequency (RF), etc. to connect and provide the communication between clients 902 and servers 906. Further, in a cloud-based computing system, resources (e.g., storage, processors, applications, memory, infrastructure, etc.) in clients 902 and server computers 906 may be shared by clients 902, server computers 906, and users across one or more networks. Resources may be shared by multiple users and can be dynamically reallocated per demand. In this regard, cloud computing may be referred to as a model for enabling access to a shared pool of configurable computing resources.

Clients 902 may execute a client application or web browser and communicate with server computers 906 executing web servers 910. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 902 may be downloaded from server computer 906 to client computers 902 and installed as a plug-in or ACTIVEX control of a web browser. Accordingly, clients 902 may utilize ACTIVEX components/component object model (COM) or distributed COM (DCOM) components to provide a user interface on a display of client 902. The web server 910 is typically a program such as MICROSOFT'S INTERNET INFORMATION SERVER.

Web server 910 may host an Active Server Page (ASP) or Internet Server Application Programming Interface (ISAPI) application 912, which may be executing scripts. The scripts invoke objects that execute business logic (referred to as business objects). The business objects then manipulate data in database 916 through a database management system (DBMS) 914. Alternatively, database 916 may be part of, or connected directly to, client 902 instead of communicating/obtaining the information from database 916 across network 904. When a developer encapsulates the business functionality into objects, the system may be referred to as a component object model (COM) system. Accordingly, the scripts executing on web server 910 (and/or application 912) invoke COM objects that implement the business logic. Further, server 906 may utilize MICROSOFT'S TRANSACTION SERVER (MTS) to access required data stored in database 916 via an interface such as ADO (Active Data Objects), OLE DB (Object Linking and Embedding DataBase), or ODBC (Open DataBase Connectivity).

Generally, these components 900-916 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 902 and 906 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 902 and 906. Embodiments of the invention are implemented as a software/CAD application on a client 902 or server computer 906. Further, as described above, the client 902 or server computer 906 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide at least one or more of the following features:

1. The notion of a dependency graph (VHLG) based on document versions that can connect users and companies;
2. Use of a VHLG for insights on community detection and collaboration networks; and
3. Use of a VHLG to power end user features for sharing and collaboration on documents.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for tracking document versioning, comprising:
   (a) before executing an open operation on a first document version, generating a first before-hash of the first document version;
   (b) a user or an application executing the open operation;
   (c) after executing the open operation, generating a first after-hash of the first document version;
   (d) before executing a save operation on the first document version, acquiring the first before-hash of the first document version;
   (e) the user or the application executing a save operation on the first document version resulting in a second document version;
   (d) after executing the save operation, generating a second after-hash of the second document version;
   (e) generating a version hash linked graph (VHLG), wherein the VHLG comprises:
      (i) a first document version node comprising the first before-hash;
      (ii) a second document version node comprising the second after-hash;
      (iii) a user-application node corresponding to the user or application that executed the open operation and the save operation;
      (iv) an open operation edge connecting the user-application node to the first document version node, wherein the open operation edge identifies the open operation;
      (v) a save operation edge connecting the user-application node to the second document version node, wherein the save operation edge identifies the save operation; and
      (vi) a document edge connecting the first document version node to the second document version node; and
   (f) providing a full history of a document based on the VHLG.

2. The computer-implemented method of claim 1, wherein the generating the VHLG comprises:
   sending information for the open operation and information for the save operation to a VHLG generating service, wherein:
      the information for the open operation comprises the first before-hash, the first after-hash, and an identification of the open operation; and
      the information for the save operation comprises the first before-hash, the second after-hash, and an identification of the save operation; and
   the VHLG generating service generating the VHLG based on the information.

3. The computer-implemented method of claim 2, wherein:
   the information for the open operation comprises a first log item;
   the first log item comprises:
      an anonymized user identification corresponding to the user or the application;

a platform used by the user or the application;
the identification of the open operation;
the first before-hash;
the first after-hash; and
a time the open operation was performed;
the information for the save operation comprises a second log item;
the second log item comprises:
the anonymized user identification corresponding to the user or the application;
the platform used by the user or the application;
the identification of the save operation;
the first before-hash;
the second after-hash; and
a time the save operation was performed.

4. The computer-implemented method of claim 1, further comprising:
scaling the VHLG across time and multiple users or multiple applications;
determining a lineage based on the VHLG, wherein:
the lineage comprises a collection of documents related by a version chain;
the collection of documents comprises the first document version and the second document version; and
the version chain comprises the document edge.

5. The computer-implemented method of claim 4, further comprising:
augmenting the first document version node and the second document version node with contextual data;
determining, based on the lineage and contextual data, a community that collaborates.

6. The computer-implemented method of claim 5, further comprising:
determining, based on the contextual data, an industry type of the community.

7. The computer-implemented method of claim 5, further comprising:
determining, based on the VHLG, an access pattern over time.

8. The computer-implemented method of claim 1, wherein:
data for the document is stored independently from the VHLG;
regardless of a device platform being used to access the first document version, the first before-hash remains the same; and
regardless of the device platform being used to access the second document version, the second after-hash remains the same.

9. The computer-implemented method of claim 1, further comprising:
providing, to collaborating users, a graphical user interface (GUI) comprising a visualization of the VHLG, wherein the visualization displays access patterns and dependencies between the first document version and the second document version.

10. The computer-implemented method of claim 1, further comprising:
the user or the application accessing the first document version or the second document version;
determining, based on the VHLG, whether the first document version or the second document version is a most current version of the document, wherein the determining comprises querying the VHLG; and
informing the user or the application a result of the determining.

11. A computer-implemented system for tracking document versioning, comprising:
(a) a computer having a memory;
(b) a processor executing on the computer;
(c) the memory storing a set of instructions, wherein the set of instructions, when executed by the processor cause the processor to perform operations comprising:
(i) before executing an open operation on a first document version, generating a first before-hash of the first document version;
(ii) a user or an application executing the open operation;
(iii) after executing the open operation, generating a first after-hash of the first document version;
(iv) before executing a save operation on the first document version, acquiring the first before-hash of the first document version;
(v) the user or the application executing a save operation on the first document version resulting in a second document version;
(vi) after executing the save operation, generating a second after-hash of the second document version;
(vii) generating a version hash linked graph (VHLG), wherein the VHLG comprises:
(A) a first document version node comprising the first before-hash;
(B) a second document version node comprising the second after-hash;
(C) a user-application node corresponding to the user or application that executed the open operation and the save operation;
(D) an open operation edge connecting the user-application node to the first document version node, wherein the open operation edge identifies the open operation;
(E) a save operation edge connecting the user-application node to the second document version node, wherein the save operation edge identifies the save operation; and
(F) a document edge connecting the first document version node to the second document version node; and
(viii) providing a full history of a document based on the VHLG.

12. The computer-implemented system of claim 11, wherein the operations generating the VHLG comprises:
sending information for the open operation and information for the save operation to a VHLG generating service, wherein:
the information for the open operation comprises the first before-hash, the first after-hash, and an identification of the open operation; and
the information for the save operation comprises the first before-hash, the second after-hash, and an identification of the save operation; and
the VHLG generating service generating the VHLG based on the information.

13. The computer-implemented system of claim 12, wherein:
the information for the open operation comprises a first log item;
the first log item comprises:
an anonymized user identification corresponding to the user or the application;
a platform used by the user or the application;
the identification of the open operation;
the first before-hash;

the first after-hash; and
a time the open operation was performed;
the information for the save operation comprises a second log item;
the second log item comprises:
the anonymized user identification corresponding to the user or the application;
the platform used by the user or the application;
the identification of the save operation;
the first before-hash;
the second after-hash; and
a time the save operation was performed.

14. The computer-implemented system of claim 11, wherein the operations further comprise:
scaling the VHLG across time and multiple users or multiple applications;
determining a lineage based on the VHLG, wherein:
the lineage comprises a collection of documents related by a version chain;
the collection of documents comprises the first document version and the second document version; and
the version chain comprises the document edge.

15. The computer-implemented system of claim 14, wherein the operations further comprise:
augmenting the first document version node and the second document version node with contextual data;
determining, based on the lineage and contextual data, a community that collaborates.

16. The computer-implemented system of claim 15, wherein the operations further comprise:
determining, based on the contextual data, an industry type of the community.

17. The computer-implemented system of claim 15, wherein the operations further comprise:
determining, based on the VHLG, an access pattern over time.

18. The computer-implemented system of claim 11, wherein:
data for the document is stored independently from the VHLG;
regardless of a device platform being used to access the first document version, the first before-hash remains the same; and
regardless of the device platform being used to access the second document version, the second after-hash remains the same.

19. The computer-implemented system of claim 11, wherein the operations further comprise:
providing, to collaborating users, a graphical user interface (GUI) comprising a visualization of the VHLG, wherein the visualization displays access patterns and dependencies between the first document version and the second document version.

20. The computer-implemented system of claim 11, wherein the operations further comprise:
the user or the application accessing the first document version or the second document version;
determining, based on the VHLG, whether the first document version or the second document version is a most current version of the document, wherein the determining comprises querying the VHLG; and
informing the user or the application a result of the determining.

* * * * *